United States Patent
Hayes

(10) Patent No.: US 7,637,022 B2
(45) Date of Patent: Dec. 29, 2009

(54) DAMPING SYSTEM AND METHOD FOR A PENDULOUSLY SUPPORTED CROSSLINE GENERATOR

(75) Inventor: James Hayes, Urbana, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 485 days.

(21) Appl. No.: 11/567,245

(22) Filed: Dec. 6, 2006

(65) Prior Publication Data

US 2008/0134527 A1 Jun. 12, 2008

(51) Int. Cl.
*G01C 5/02* (2006.01)

(52) U.S. Cl. .................................................. 33/291

(58) Field of Classification Search .................. 33/290, 33/291, 292
See application file for complete search history.

(56) References Cited

U.S. PATENT DOCUMENTS

| | | | |
|---|---|---|---|
| 3,936,197 A | 2/1976 | Aldrink et al. | |
| 4,221,483 A | 9/1980 | Rando | |
| 4,708,024 A * | 11/1987 | Hojo et al. | 33/327 |
| 5,459,932 A | 10/1995 | Rando et al. | |
| 5,524,352 A | 6/1996 | Rando et al. | |
| 5,610,711 A | 3/1997 | Rando | |
| 5,617,202 A | 4/1997 | Rando | |
| 5,619,802 A | 4/1997 | Rando et al. | |
| 5,636,018 A * | 6/1997 | Hirano et al. | 33/291 |
| 5,724,744 A | 3/1998 | Bozzo | |
| 5,992,029 A | 11/1999 | Dong | |
| 6,043,879 A | 3/2000 | Dong | |
| 6,384,420 B1 | 5/2002 | Doriguzzi | |
| 6,384,913 B1 | 5/2002 | Douglas et al. | |
| 6,568,094 B2 | 5/2003 | Wu | |
| 6,763,595 B1 | 7/2004 | Hersey | |
| 6,938,350 B1 | 9/2005 | Hersey | |
| 7,031,367 B2 | 4/2006 | Marshall et al. | |
| 7,032,318 B2 | 4/2006 | Hayes et al. | |
| 7,073,269 B2 | 7/2006 | McCarty | |
| 2006/0123649 A1* | 6/2006 | Muller | 33/559 |
| 2007/0044333 A1* | 3/2007 | Qi et al. | 33/291 |
| 2007/0089309 A1* | 4/2007 | Kodaira | 33/290 |
| 2008/0078091 A1* | 4/2008 | McCracken | 33/291 |

FOREIGN PATENT DOCUMENTS

DE 9418591 U1 2/1995

OTHER PUBLICATIONS

International Search Report and Written Opinion dated Feb. 6, 2008 pertaining to International application No. PCT/US2007/085725.
International Preliminary Report on Patentability dated Jun. 18, 2009 pertaining to International application No. PCT/US2007/085725.

* cited by examiner

*Primary Examiner*—G. Bradley Bennett
(74) *Attorney, Agent, or Firm*—Dinsmore & Shohl LLP

(57) ABSTRACT

A damping system and method for a pendulously supported crossline generator is disclosed. The crossline generator comprises a support body pendulously supported and having ear portions and a paddle. A rotation damping device having cages each with a magnet set is provided, wherein the ear portions extend into respective ones of the cages. A pitch damping device having a damping housing and a ring magnet supported in the damping housing is also provided. The paddle has a plate portion situated below the ring magnet.

21 Claims, 5 Drawing Sheets

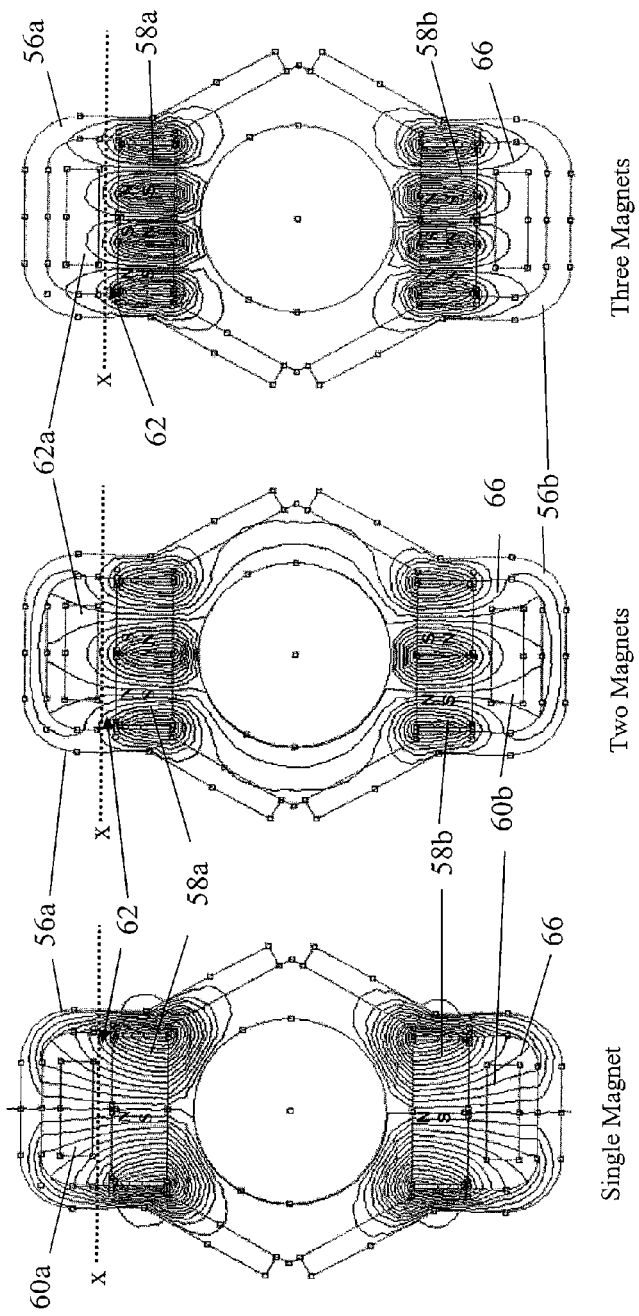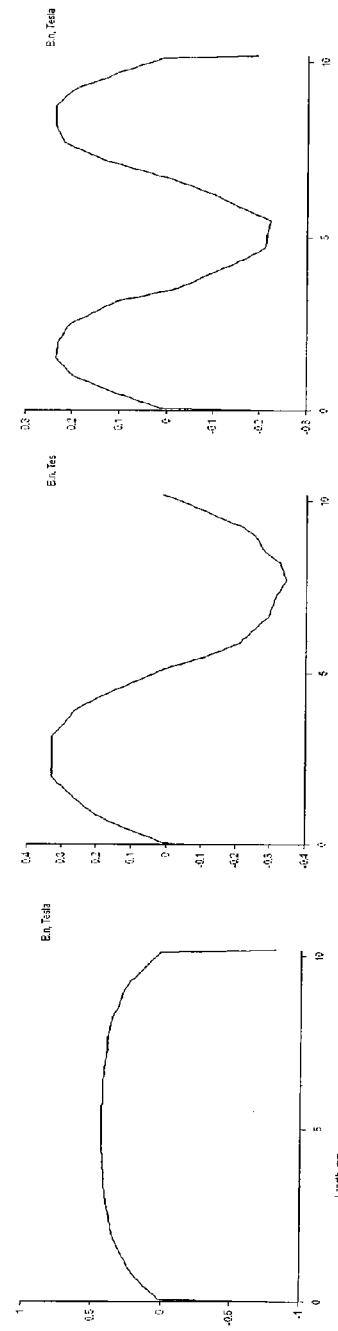
FIG. 6A  Single Magnet
FIG. 6B  Two Magnets
FIG. 6C  Three Magnets

DAMPING SYSTEM AND METHOD FOR A PENDULOUSLY SUPPORTED CROSSLINE GENERATOR

BACKGROUND OF THE INVENTION

The present invention relates to crossline generators and in particular to a damping system for a pendulously supported crossline generator and a method thereof.

Pendulously supported crossline generators, such as used in a laser level, are known in the art for producing visible lines used for references in leveling and squaring operations. Criteria for acceptable performance of the pendulously supported crossline generator involve steady state stability of the generated lines on a work surface, such as a wall, as well as the transient time to stop oscillatory motion after the crossline generator is disturbed. This oscillatory motion occurs in two directions. The first is the translation of the horizontal line up and down a vertical plane, and is simply the result of the pendulously support crossline generator pitching or swinging. The second is the translation of the vertical line back and forth about a horizontal plane (i.e., rotational direction), which is caused by the pendulously supported crossline generator rotating. Oscillatory motion in the rotational direction is allowed by the torsional compliance of a suspension member, such as a spring or a wire, used to suspend the crossline generator.

To damping the above-mentioned pitch and rotational oscillatory motions in both the vertical and rotational directions, some prior art laser levels utilized a paddle on the bottom of the pendulously support crossline generator. Submerging the paddle in a pool of silicone fluid provides the desired damping. Although very effective, problems remained in reliably containing the fluid without spilling or migration onto adjacent parts.

In other prior art pendulously support crossline generators, magnetic damping has been used for some time. Magnetic damping has distinct advantages over fluid damping when it comes to practical implementation into the crossline generator. However, to date, most of the concerns with this method centers on magnetic damping not being generally as effective as fluid damping.

SUMMARY OF THE INVENTION

It is against the above-mentioned background that the present invention addresses dampening the pitch and rotational oscillatory motions of a pendulously supported cross line generator in both the vertical and rotational directions using magnetic damping.

In one embodiment, a crossline generator comprising a support body pendulously supported and having ear portions and a paddle is disclosed. A rotation damping device having cages each with a magnet set is provided. The ear portions extend into respective ones of the cages. A pitch damping device having a damping housing and a ring magnet supported in the damping housing is also provided. The paddle has a plate portion situated below the ring magnet.

In another embodiment, a damping method for a pendulously supported crossline generator is disclosed. The damping method comprises providing ear portions and a paddle to a support body of the pendulously supported crossline generator, and providing a rotation damping device having cages and magnet sets. Each of the ear portions extends into a respective one of the cages adjacent a respective one of the magnet sets. The method further includes providing a pitch damping device having a damping housing and a ring magnet supported in the damping housing. The paddle has a plate portion situated below the ring magnet.

These and other features and advantages of the invention will be more fully understood from the following description of the various embodiments of the invention taken together with the accompanying drawing.

BRIEF DESCRIPTION OF THE DRAWINGS

The organization and manner of operation of the invention, together with further objects and advantages thereof, may best be understood by reference to the following description taken in connection with the accompanying drawing in which like elements are represented by like numbers, and in which:

FIGS. 6A, 6B, and 6C are rotation damping device embodiments according to the present invention each with a corresponding field plot for damping rotational oscillation.

Figure 1:
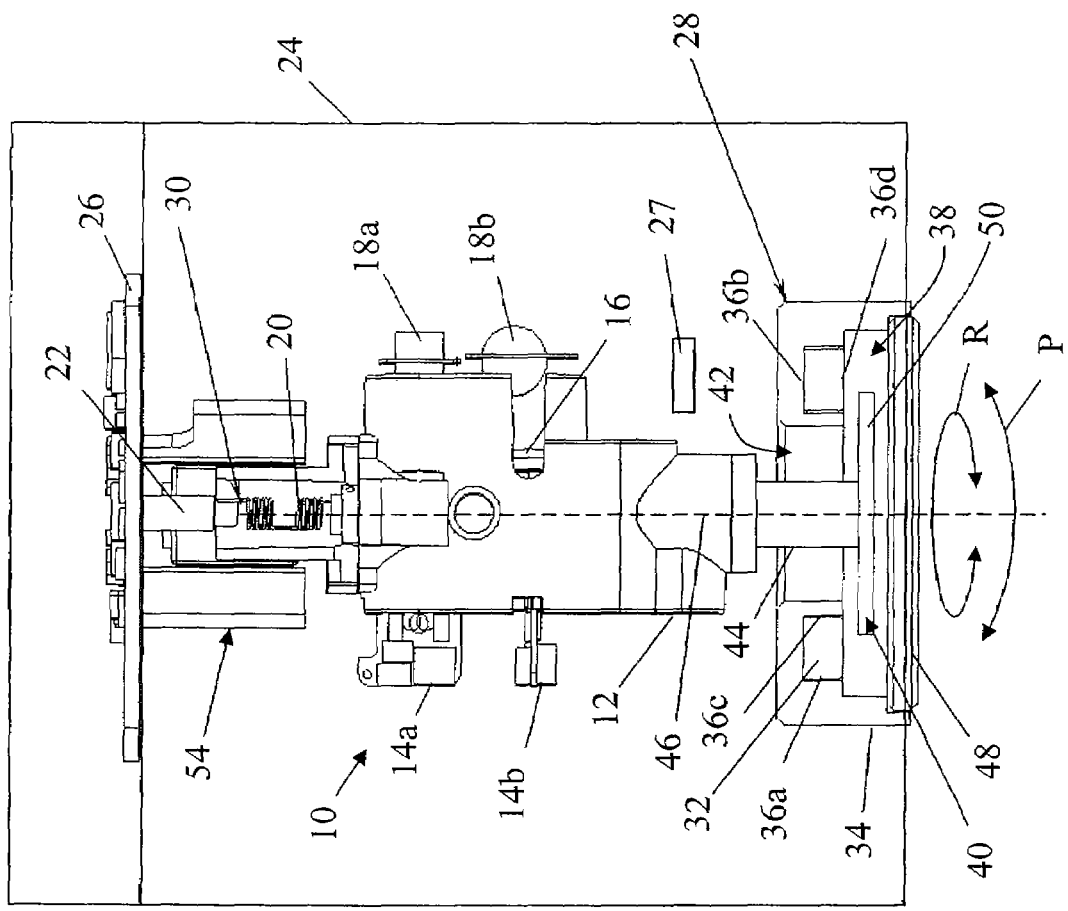
FIG. 1 is a first side view of a crossline generator according to the present invention showing rotational and pitch directions and showing a pitch damping device according to the present invention.

Skilled artisans appreciate that elements in the drawing are illustrated for simplicity and clarity and have not necessarily been drawn to scale. For example, the dimensions of some of the elements in the drawing may be exaggerated relative to other elements to help to improve understanding of the various embodiments of the present invention.

DETAILED DESCRIPTION

While the invention may be susceptible to embodiments in different forms, there is shown in the drawing, and herein will be described in detail, specific embodiments with the understanding that the present disclosure is to be considered an exemplification of the principles of the invention, and is not intended to limit the invention to that as illustrated and described herein.

Types of Pendulum Motion

In an illustrative embodiment, with parts removed for simplification of illustration, a crossline generator 10 is shown generally in FIG. 1. A pendulous support body 12 of the crossline generator 10 houses a pair of laser diodes 14a and 14b, collimating lenses 16 and cylinder lenses 18a and 18b. The support body 12 is suspended via a suspension spring 20. The suspension spring 20 is mounted to a support pin 22 that is fixed to a housing 24 accommodating the crossline generator 10. A controller 26 is also provided to control the functions of the crossline generator 10, and is conventional therefore no further discussion is provided. A power supply (not shown) is also provided to provide power to the crossline generator 10 and controller 26, which is also conventionally controlled by the controller 26.

Figures 4, 5:
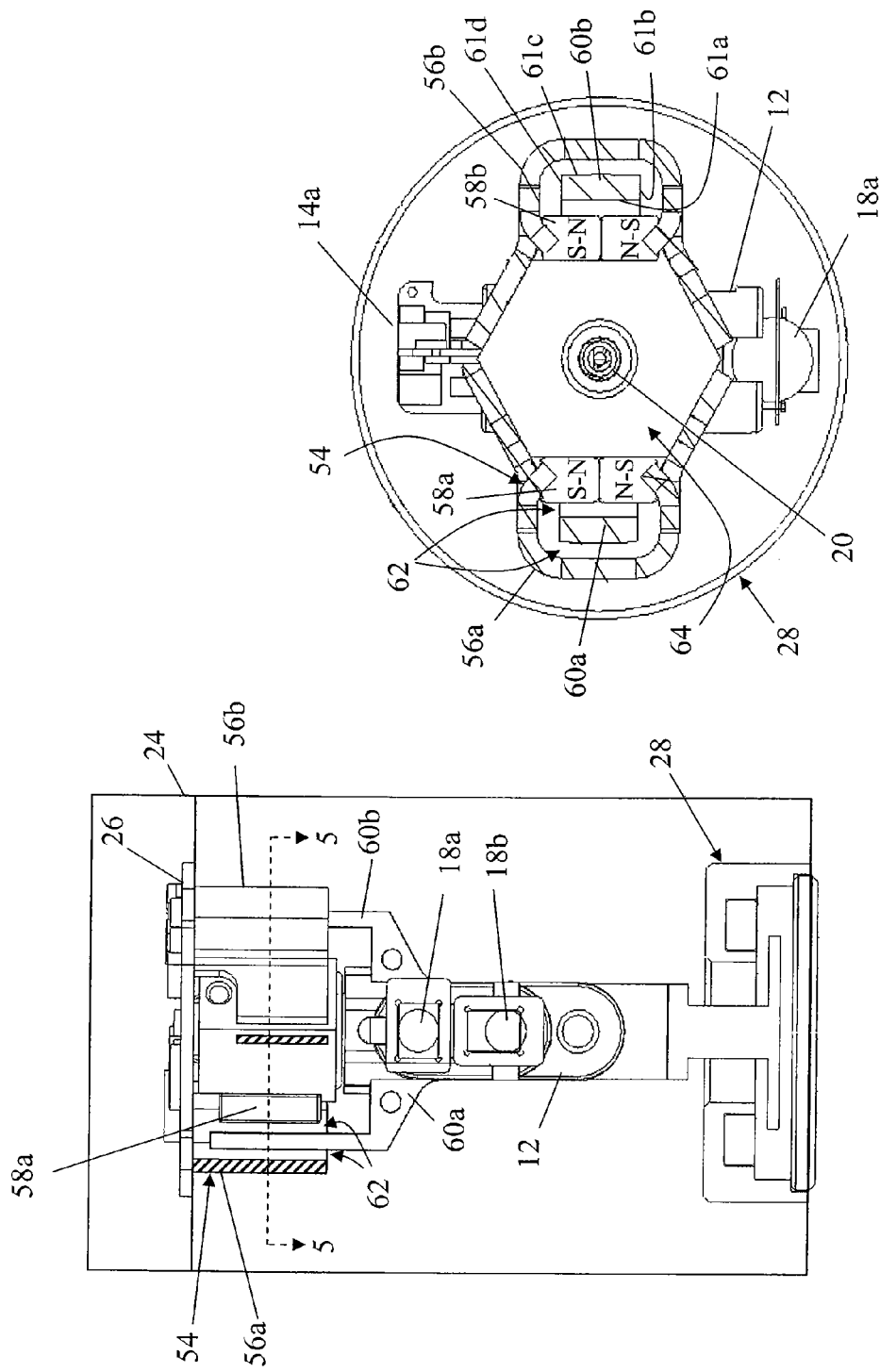
FIG. 4 is a second side view of the crossline generator of FIG. 1, showing a rotation damping device according to the present invention.
FIG. 5 is a section view of the crossline generator of FIG. 4 taken along line 5-5.

As used herein, the primary mode of the beam oscillation is considered to be swing in the pitch direction, which is indicated by line P. In addition to the pitch oscillation P, a secondary mode of the beam oscillation is a rotational oscillation, which is indicated by line R. This rotational oscillation R occurs as a result of the angular momentum of the pendulum mass winding up the suspension spring 20 within the limits, for example, of a rotational stop 27 in one embodiment. In other embodiments, the rotational stop is defined with the free swing space that a rotation damping device 54 provides pendulum ear portions 60a and 60b (FIG. 4).

Damping the Pitch Oscillation

FIG. 1 shows a pitch damping device, generally indicated by symbol 28, according to the present invention that uses a magnetic to damp out the primary pitch oscillation of the pendulum. The pitch damping device 28 is provided at the lowest part of the pendulous support body 12. The lowest part of the support body 12 provides the most leverage with respect to an effective pivot point 30, i.e., mounting point between support pin 22 and the suspension spring 20.

The pitch damping device 28 includes a ring magnet 32 accommodated in a damping housing 34 on three sides: outside 36a, top 36b, and inside 36c. A fourth side or bottom 36d of the ring magnet 32 is exposed to a cavity 38 defined by the damping housing 34. The pitch damping device 28 further includes a damping paddle 40 having a neck portion 44 and a plate portion 50. The neck portion 44 is connected to the support body 12, and extends through a throughbore 42 provided in the damping housing 34. The throughbore 42 is sized to permit the neck portion 44 of the damping paddle 40 to swing freely, and pitch ±5.25° from a centerline or main axis 46. The neck portion 44 has a length that situations the plate portion 50 below the bottom 36d of the ring magnet 32. A cover plate 48 is also provided to enclose the plate portion 50 of the damping paddle 40 within the cavity 38 of the damping housing 34.

Both the damping housing 34 and cover plate 48 are made from a magnetic material, such as for example, and not to be limited to, a martensitic grade of stainless steel. The plate portion 50 of the damping paddle 40 is made from a nonferrous material, such as for example, and not to be limited to, aluminum (alloy 6061-T6). The neck portion 44 may or may not be the same material as the plate portion 50 and in one embodiment is a polymer material, and in another embodiment is a metal, alloyed, or any other suitable material for rigidly supporting the plate portion 50 in the cavity 38 of the damping housing 34. The ring magnetic 32 is in one embodiment a rare earth magnet, and in other embodiments is any permanent magnet, such as for example, made from a ferromagnetic material.

Figure 2:
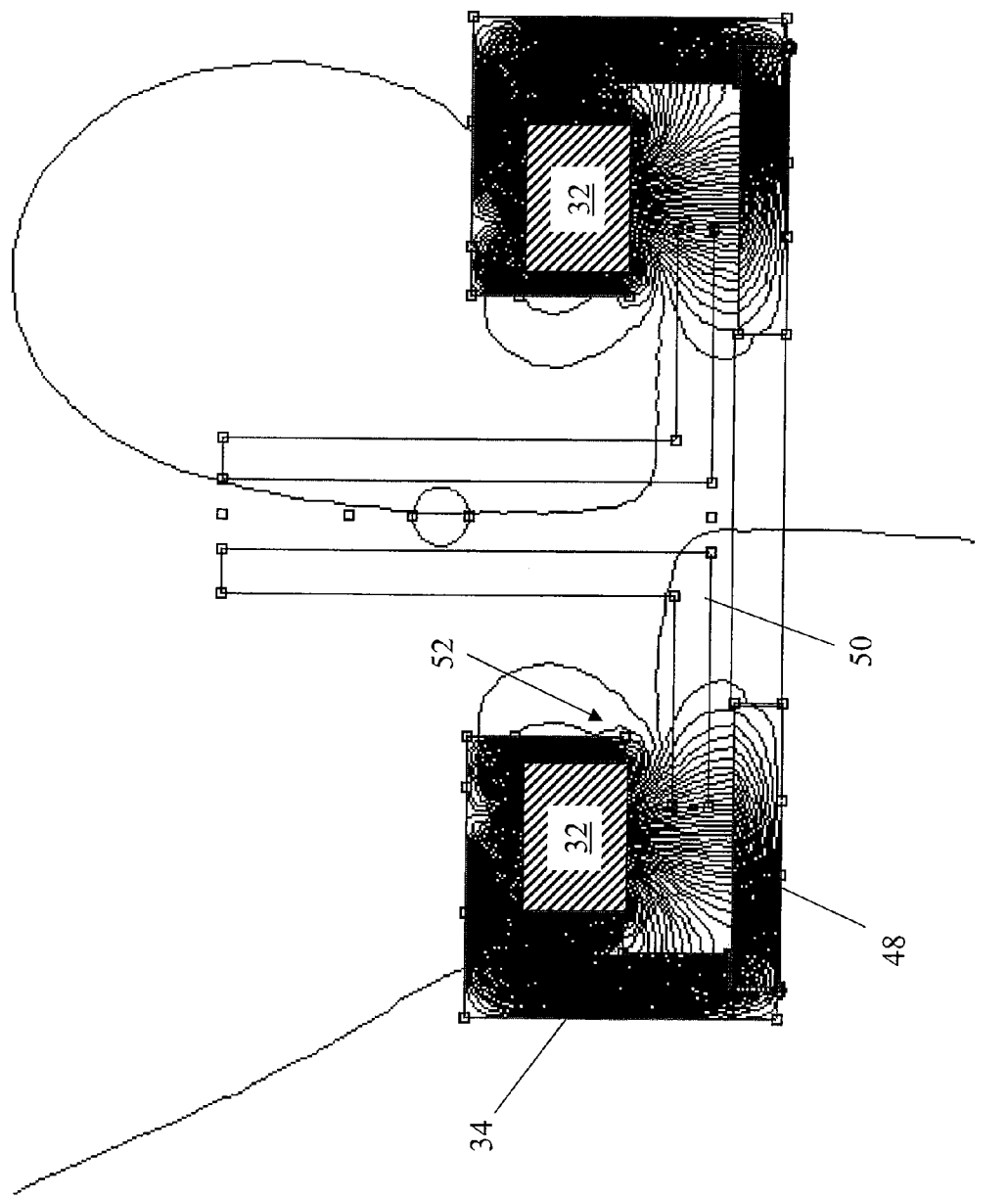
FIG. 2 is a field plot for damping pitch oscillation according to the present invention.

FIG. 2 is a field plot for the pitch damping device 28, which was generated via the 2D finite element method. The damping housing 34 and cover plate 48 both act in concert to direct the magnetic field 52 of the ring margent 32 into the cavity 38 of the housing and through the plate portion 50 of the damping paddle 40. In addition, the damping housing 34 and cover plate 48 entrap stray lines of the magnetic field 52 to ensure their effects on the laser diodes 14a and 14b are minimal.

Figure 3:
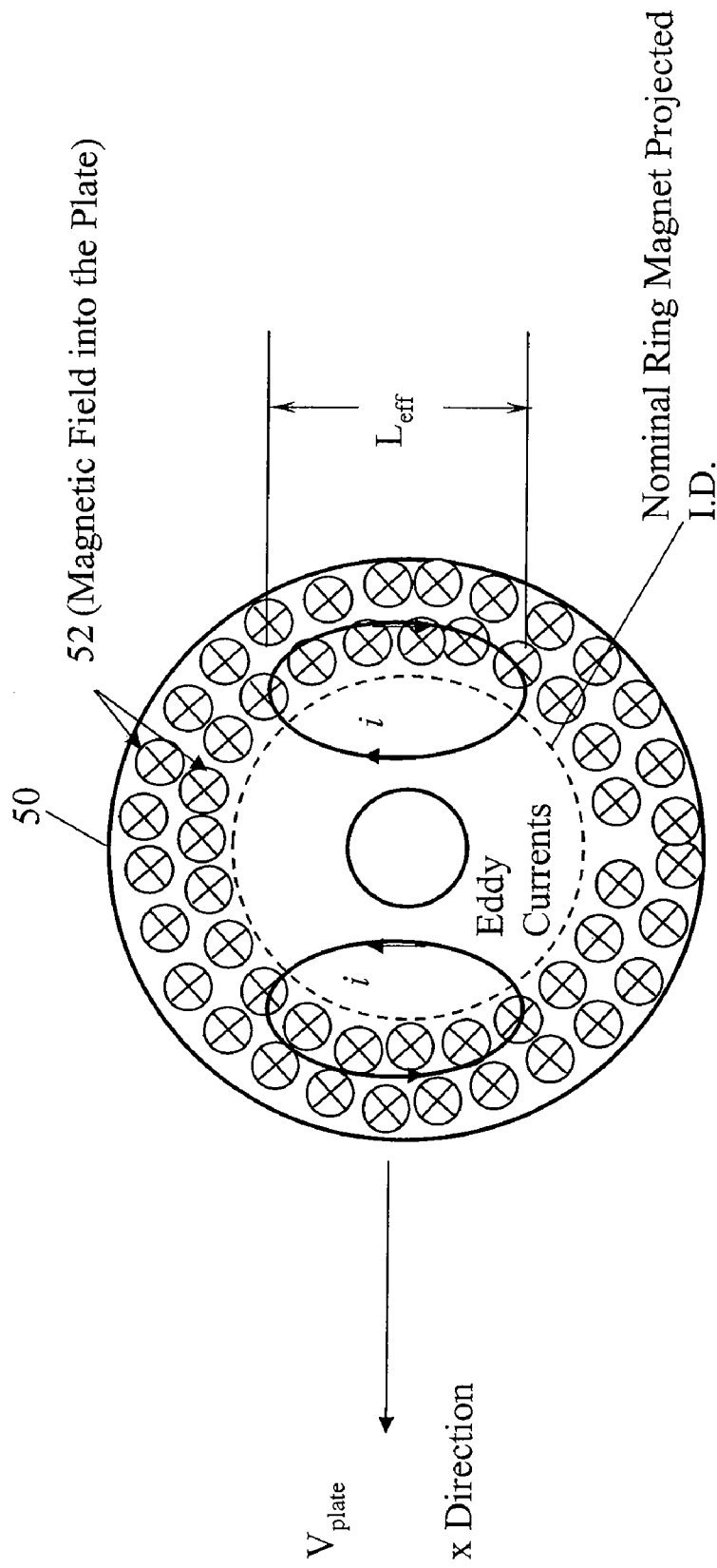
FIG. 3 is an illustration of the effect of the magnetic field on a damping plate according to the present invention.

To better show the nature of the interaction between the magnetic field 52 and the plate portion 50 in motion, reference is made to FIG. 3, which shows an approximation of the field pattern on the moving damping plate portion 50. For this approximation it is assumed that the magnetic field 52 is both constant and uniform. When the plate portion 50 moves within the magnetic field 52 it experiences a force as a result of the interaction between the two. This force is governed by the Lorenz relation and is expressed by Equation 1:

$$\vec{F} = -q(\vec{v} \times \vec{B})$$ (Eq. 1)

where q is the charge in the plate, $\vec{v}$ is the velocity vector of the charge, and $\vec{B}$ is the magnetic field vector.

The relationship between the electromotive force (EMF) and the velocity of the plate portion 50 is defined by Faraday's law. It states that the EMF is directly proportional to the rate of change of the magnetic flux through the provided circuit.

$$\varepsilon = -\frac{d\Phi}{dt} = -\frac{d}{dt} \oint \vec{B} \cdot d\vec{A}$$ (Eq. 2)

In this case, the magnetic field 52 can be assumed to be relatively constant. As the plate portion 50 of the damping paddle 40 swings in and out of the magnetic field 52 the area exposed changes resulting in a corresponding change in acquired flux. Note from Equation 1 that the effects of crossing the direction of the current at the top and bottom of the current loops with the B field cancel. Therefore, the only direction of current through the magnetic field 52 that affects the motion of the damping paddle 40 is perpendicular to that of the motion of the plate portion 50.

It is convenient to assume an effective length for the current loop perpendicular to the direction of motion. This is also shown in FIG. 3. Equating the electromotive force to the motion of the plate portion 50 of the damping paddle 40 involves converting the differential area to the known effective height times a differential width (dA=Ldx). This allows us to express the electromotive force on the plate portion 50 according to Equation 3:

$$\epsilon = BLV_{plate}$$ (Eq. 3)

The actual stopping force on the damping paddle 40, and hence the support body 12, results from forces exerted by the magnet 32 on the induced currents on the plate portion 50, which acts as the conductor. This braking force is expressed according to Equation 4 as follows:

$$\vec{F} = i\vec{L} \times \vec{B} = i\vec{L}_{eff}B$$ (Eq. 4)

The above device 28 provides damping in the pitch direction P with only the use of the ring magnet 32. However, it can be seen that if the motion of the damping paddle 40 were in pure rotation about the main axis 46 no change in the effective length in the direction of the motion would occur and there would be no resulting change in area or flux. Therefore, no damping in the rotational direction would occur.

Damping the Rotation Oscillation (Line)

With reference made to FIG. 4, showing another side view of the crossline generator 10, to provide damping in the rotational direction R, a rotation damping device 54 is provided adjacent the top of the pendulous support body 12, near the suspension spring 20. It is to be appreciated that providing the rotation damping device 54 at this position in the housing 24 also addresses the quiver affect where the pendulous support body 12 can oscillate about its own center of gravity.

The rotation damping device 54 includes cages 56a and 56b, each housing a set of magnets 58a and 58b, respectively. As will be explained in a later section with reference to FIGS. 6A-6C, the set of magnets may include one, two, three, or more magnets situated in N-S pole alignment. Ear portions 60a and 60b of the pendulous support body 12 extend upward into respective ones of the cages 56a and 56b, and are situated in close proximity to a respective one of the set of magnets 58a and 58b on a first side 61a as shown by FIG. 5. On the remaining sides 61b-d of each of the ear portions 60a and 60b are surrounded by their associated cage 56a and 56b. The cages 56a and 56b and ear portions 60a and 60b of the support body are a ferrous material, such as an alloy steel. The magnet sets 58a and 58b may be the same material as ring magnet 32 (FIG. 1).

An air gap 62 is provided between each ear 60a, 60b and the respective cage 56a and 56b, and magnet set 58a and 58b. A portion of cage 56a is sectioned, showing the nominal position of the ear portion 60a and the provided air gap 62. The air gap 62 is best shown by FIG. 5.

In the illustrated embodiment shown by FIG. 5, the magnet sets 58a and 58b each having two magnets which are oriented such that the adjacent magnet poles are opposite. In other embodiments, such as depicted by FIGS. 6a and 6C, the magnets sets 58a and 58c may have one and three magnets per magnet set, respectively, oriented in the same manner. In other embodiment, four or more magnets in each magnet set may be provided, if desired. In addition, the magnet sets 58a and 58b, as well as the cages 56a and 56b, are aligned on opposite sides of the support body 12 with each other. The magnet sets 58a and 58b are oriented such that the magnet poles (N, S) directly facing each other across the support body are opposite as shown by FIGS. 6A, 6B, and 6C. It is to be appreciated that the cages 56a and 56b and magnet sets 58a and 58b are effective in killing stray magnetic fields within the air gaps 62 and 64 (FIG. 5) between the ears 60a and 60b and where the pendulous body 12 resides, respectively. The cages 56a and 56b accordingly reduce the risk of magnetic pull on the suspension spring 20 which, if not addressed, can cause calibration errors.

The theory behind the magnetic damping of rotation oscillation is the same as described above for pitch oscillation. A significant difference exists, however, in the implementation. Recall that for the pitch oscillation of the paddle is swinging in and out of a relatively constant field pattern. Equation 2 suggests that if the field is constant you must have the area changing, capturing more magnetic field lines, to affect a changing flux, thus creating the electromotive force. The opposite condition exists for rotation oscillation. Therefore, for the rotation damping, the ear portions 60a and 60b of the support body 12 are both fully immersed in the magnetic field 66 contained in each respective cage 56a and 56b, as depicted for the embodiment of FIGS. 6A-6C. In this case changing the area cannot attain a change in flux. Therefore, in order to achieve an electromotive force, the magnetic field must be changed across the air gap 62 where the ear portions 60a and 60b reside.

Although all three of the embodiments shown by FIGS. 6A, 6B, and 6C, will damp rotational motion to some degree, one is substantially better than the other embodiments. The single-magnet embodiment of FIG. 6A has very little change in flux that occurs as the ear portion 60a and 60b travel through the air gap 62 and is thus not too effective. The two-magnet embodiment of FIG. 6B was shown to be the best, providing rotation damping of the pendulum within approximately one and a half overshoots.

It was assumed that if two magnets used in each magnet set 58a and 58b were sufficient, then the use of three magnets in each magnet set 58a and 58b, such as depicted by FIG. 6C, should be better. However, inspection of field plots for the various magnet embodiments reveal that the amplitude of the field for the three-magnet embodiment of FIG. 6C to be less than that of the two-magnet embodiment of FIG. 6B. This anomaly is due to the stacked magnets in the three-magnet embodiment providing compactor field lines which do not extend completely through the ear portions 60a and 60b of the support body 12. The associated field plots where taken across each air gap 62 along the line indicated by symbol x. Accordingly, the two-magnetic embodiment provides better performance over the other illustrated embodiments.

The above-described embodiments are intended to illustrate the principles of the invention, not to limit its scope. Other embodiments in variations to these preferred embodiments will be apparent to those skilled in the art, such as for example, the above-mentioned portions 44, 50, 60a, and 60b may be either integral with their associated element, or an individual element provided to the associated element. Other such variations may be made without departing from the spirit and scope of the invention as defined in the following claims.

What is claimed is:

1. A crossline generator, comprising:
   a support body pendulously supported and having ear portions and a paddle;
   a rotation damping device having cages and magnet sets, each of said ear portions extending into a respective one of said cages adjacent a respective one of said magnet sets; and
   a pitch damping device having a damping housing and a ring magnet supported in said damping housing, said paddle having a plate portion situated adjacent said ring magnet.

2. The crossline generator as recited by claim 1, wherein each of said ears is surrounded on three sides by said respective one of said cages.

3. The crossline generator as recited by claim 1, wherein each of said ears is situated to face said magnet set on a side and have an air gap therebetween.

4. The crossline generator as recited by claim 1, wherein each of said ears is situated to face said respective one of said magnet sets on a side, and is surrounded on remaining sides by said respective one of said cages.

5. The crossline generator as recited by claim 1, wherein each of said ears is situated to face said respective one of said magnet sets on a side, and is surrounded on remaining sides by said respective one of said cages, wherein there is an air gap provided between said respective ones of said ears, said cages, and magnet sets.

6. The crossline generator as recited by claim 1, wherein said magnet sets is selected from one, two, and three magnets.

7. The crossline generator as recited by claim 1, wherein said magnet sets are aligned with each other across said support body and oriented such that directly facing magnet poles are opposite.

8. The crossline generator as recited by claim 1, wherein said magnet sets each have a plurality of magnets oriented with adjacent magnets having opposite magnet poles.

9. The crossline generator as recited by claim 1, wherein said magnet sets are aligned with each other across said support body and oriented such that directly facing magnet poles are opposite, and wherein said magnet sets each have a plurality of magnets oriented with adjacent magnets having opposite magnet poles.

10. The crossline generator as recited by claim 1, wherein said magnet sets are aligned with each other across said support body and oriented such that directly facing magnet poles are opposite, wherein said magnet sets each have a plurality of magnets oriented with adjacent magnets having opposite magnet poles, and wherein each of said ears is surrounded on three sides by said respective one of said cages.

11. The crossline generator as recited by claim 1, wherein said magnet sets are aligned with each other across said support body and oriented such that directly facing magnet poles are opposite, wherein said magnet sets each have a plurality of magnets oriented with adjacent magnets having opposite magnet poles, and wherein each of said ears is situated to face said respective one of said magnet sets on a side and is surrounded on remaining sides by said respective one of said cages.

12. The crossline generator as recited by claim 1, wherein said cages are aligned with each other across said support body.

13. The crossline generator as recited by claim 1, wherein said cages and said magnet sets are aligned with each other across said support body, and said magnet sets are oriented such that directly facing magnet poles are opposite.

14. The crossline generator as recited by claim 1, wherein said cages and said magnet sets are aligned with each other across said support body, wherein said magnet sets are oriented such that directly facing magnet poles are opposite, wherein each of said ears is surrounded on three sides by said respective one of said cages.

15. The crossline generator as recited by claim 1, wherein said cages and said magnet sets are aligned with each other across said support body, wherein said magnet sets are oriented such that directly facing magnet poles are opposite, and wherein each of said ears is situated to face said magnet set on a side and have an air gap therebetween.

16. The crossline generator as recited by claim 1, wherein said cages and said magnet sets are aligned with each other across said support body, wherein said magnet sets are oriented such that directly facing magnet poles are opposite, wherein each of said ears is situated to face said respective one of said magnet sets on a side and is surrounded on remaining sides by said respective one of said cages, and wherein there is an air gap provided between said respective ones of said ears, said cages, and magnet sets.

17. The crossline generator as recited by claim 1, wherein said magnet sets each have a plurality of magnets oriented with adjacent magnets having opposite magnet poles, and wherein said cages and said magnet sets are aligned with each other across said support body.

18. The crossline generator as recited by claim 1, wherein said magnet sets each have a plurality of magnets oriented with adjacent magnets having opposite magnet poles, wherein said cages and said magnet sets are aligned with each other across said support body, wherein said magnet sets are oriented such that directly facing magnet poles are opposite, wherein each of said ears is situated to face said respective one of said magnet sets on a side and is surrounded on remaining sides by said respective one of said cages, and wherein there is an air gap provided between said respective ones of said ears, said cages, and magnet sets.

19. The crossline generator as recited by claim 1, wherein said damping housing surrounds said ring magnet on three sides.

20. The crossline generator as recited by claim 1, wherein said damping housing surrounds said ring magnet on three sides, and has a cavity accommodating said plate portion, and a throughbore extending to said cavity, said paddle having a neck portion extending through said thought to support said plate portion.

21. A damping method for a pendulously supported crossline generator, comprising:
provinding ear portions and a paddle to a support body of the pendulously supported crossline generator;
providing a rotation damping device having cages and magnet sets, each of said ear portions extending into a respective one of said cages adjacent a respective one of said magnet sets; and
providing a pitch damping device having a damping housing and a ring magnet supported in said damping housing, said paddle having a plate portion situated below said ring magnet.

* * * * *